US009729940B2

(12) United States Patent
Persson et al.

(10) Patent No.: US 9,729,940 B2
(45) Date of Patent: Aug. 8, 2017

(54) APPARATUS AND METHOD FOR CONVEYING INFORMATION

(71) Applicant: Telefonaktiebolaget L M Ericsson (publ), Stockholm (SE)

(72) Inventors: Fredrik Persson, Älvsjö (SE); Erik Nordlund, Hägersten (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/763,554

(22) PCT Filed: Jun. 14, 2013

(86) PCT No.: PCT/EP2013/062377
§ 371 (c)(1),
(2) Date: Jul. 27, 2015

(87) PCT Pub. No.: WO2014/121854
PCT Pub. Date: Aug. 14, 2014

(65) Prior Publication Data
US 2015/0373424 A1   Dec. 24, 2015

Related U.S. Application Data

(63) Continuation of application No. PCT/EP2013/052250, filed on Feb. 5, 2013.

(51) Int. Cl.
*H04N 7/18* (2006.01)
*H04N 21/658* (2011.01)
(Continued)

(52) U.S. Cl.
CPC ........ *H04N 21/6581* (2013.01); *H04H 60/73* (2013.01); *H04N 21/2362* (2013.01);
(Continued)

(58) Field of Classification Search
None
See application file for complete search history.

(56) References Cited

U.S. PATENT DOCUMENTS 5,493,564 A * 2/1996 Mullan ............... H04L 29/06
340/9.17
6,035,326 A * 3/2000 Miles ............... H04L 29/12009
709/206

(Continued)

FOREIGN PATENT DOCUMENTS

EP       2 475 138 A1    7/2012
KR    2011 0136275 A    12/2011

OTHER PUBLICATIONS

International Search Report for International application No. PCT/EP2013/062377, Sep. 26, 2013.
(Continued)

*Primary Examiner* — Pankaj Kumar
*Assistant Examiner* — Timothy Newlin
(74) *Attorney, Agent, or Firm* — Baker Botts, LLP (57) ABSTRACT

There is provided a method of conveying information using a set of first identifiers, the set of first identifiers having a first number, M, of possible values for representing a first number, M, of first information items. The method comprises the steps of partitioning the set of first identifiers into a second number, N, of sub-partitions, wherein the second number, N, of sub-partitions represents the number of possible values required to represent a set of second information items. A sub-partition is used to transmit a second information item while also transmitting a first information item using a first identifier.

15 Claims, 8 Drawing Sheets

(51) Int. Cl.
  *H04H 60/73* (2008.01)
  *H04N 21/2362* (2011.01)
  *H04N 21/262* (2011.01)
  *H04N 21/434* (2011.01)
  *H04N 21/61* (2011.01)
  *H04N 21/643* (2011.01)

(52) U.S. Cl.
  CPC ... *H04N 21/26283* (2013.01); *H04N 21/4345* (2013.01); *H04N 21/6112* (2013.01); *H04N 21/6125* (2013.01); *H04N 21/64322* (2013.01)

(56) References Cited

U.S. PATENT DOCUMENTS

| | | | | |
|---|---|---|---|---|
| 6,557,171 | B1* | 4/2003 | Sonoda | H04H 20/93 348/E5.108 |
| 2003/0101283 | A1* | 5/2003 | Lewis | H04L 12/2856 709/246 |
| 2004/0008723 | A1* | 1/2004 | Uchida | H04L 12/5835 370/466 |
| 2004/0029598 | A1* | 2/2004 | Guggisberg | H04L 12/5835 455/466 |
| 2005/0055728 | A1* | 3/2005 | Gardes | H04N 21/4345 725/109 |
| 2005/0170855 | A1* | 8/2005 | Comer | H04L 12/5835 455/466 |
| 2005/0259656 | A1* | 11/2005 | Dollar | H04L 12/581 370/392 |
| 2005/0271246 | A1* | 12/2005 | Sharma | G06Q 20/3823 382/100 |
| 2006/0056419 | A1* | 3/2006 | Eichler | H04L 12/66 370/395.52 |
| 2007/0083675 | A1* | 4/2007 | Vemulapelli | G06Q 10/107 709/246 |
| 2007/0239837 | A1* | 10/2007 | Jablokov | G06Q 30/0251 709/206 |
| 2008/0113679 | A1* | 5/2008 | Sung | H04L 12/5835 455/466 |
| 2008/0141318 | A1* | 6/2008 | Kim | H04N 7/17318 725/98 |
| 2008/0208984 | A1* | 8/2008 | Rosenberg | G06Q 10/107 709/206 |
| 2008/0219416 | A1* | 9/2008 | Roujinsky | G06Q 30/02 379/88.13 |
| 2009/0129372 | A1* | 5/2009 | Pandey | G06Q 30/0267 370/352 |
| 2009/0172339 | A1* | 7/2009 | Kobayashi | G06F 13/1668 711/202 |
| 2009/0172399 | A1* | 7/2009 | Schmid | G06Q 10/107 713/168 |
| 2010/0331021 | A1* | 12/2010 | Bushnell | H04L 51/04 455/466 |
| 2013/0225153 | A1* | 8/2013 | Kim | G05B 19/4185 455/419 |
| 2015/0317978 | A1* | 11/2015 | Fry | H04M 3/42 704/275 |

OTHER PUBLICATIONS

3rd Generation Partnership Project 2 "3GPP2"; Short Message Service May 2, 2003.
3GPP TS 23.003 V11.4.0; Technical Specification; 3rd Generation Partnership Project; Technical Specification Group Core Network and Terminals; Numbering, addressing and identification (Release 11), Dec. 2012.

* cited by examiner

APPARATUS AND METHOD FOR CONVEYING INFORMATION

PRIORITY

This nonprovisional application is a U.S. National Stage Filing under 35 U.S.C. §371 of International Patent Application Serial No. PCT/EP2013/062377, filed Jun. 14, 2013, and entitled "Apparatus and Method For Conveying Information" which claims priority to International Patent Application Serial No. PCT/EP2013/052250 filed Feb. 5, 2013, both of which are incorporated herein by reference.

TECHNICAL FIELD

The present invention relates to an apparatus and method for conveying information, and in particular to an apparatus and method for conveying additional information using a set of identifiers, such as an existing set of identifiers.

BACKGROUND

In many technical fields, such as television and telecommunications, technical advancements have led to a huge evolvement of the capabilities and performance of devices used in those fields, both in terms of client devices and server devices. Despite the continual evolvement of such devices, there is still a need to support legacy protocols and services, particularly when replacement alternatives have not taken full effect.

One area of technological advancement is the smart phone evolution. Today a smart phone is better described as a portable computer with mobile data access that also can receive phone calls. Legacy services such as short-message-service (SMS) messaging still need to be supported even if alternative forms of messaging exist, such as iMessage™.

Another area of technological advancement is the television and set-top-box (STB) evolution. Today a modern STB has a broadband connection and can view On-Demand or Linear content via MPEG or Adaptive Streaming via a broadband connection, while still receiving Linear TV transmissions via legacy digital video broadcast (DVB) protocols such as DVB-C/T/S.

Focusing into the details of legacy protocols (such as DVB), one can see that they often contain identifiers. Identifiers are used as unique references for entities such as television programs, channels, and so on. In telecommunication applications identifiers are also used in applications such as SMS messaging, whereby an identifier is used to identify a particular message, or message thread.

A problem with such legacy systems is that new devices would like to extend the existing legacy protocols to carry additional information. However, due to protocol limitations, existing legacy devices and/or existing infrastructure, this might be impossible or too costly.

SUMMARY

It is an aim of the present invention to provide a method and apparatus which help obviate or reduce at least one or more of the of the disadvantages mentioned above.

According to a first aspect of the invention there is provided a method of conveying information using a set of first identifiers, the set of first identifiers having a first number, M, of possible values for representing a first number, M, of first information items. The method comprises the steps of partitioning the set of first identifiers into a second number, N, of sub-partitions, wherein the second number, N, of sub-partitions represents the number of possible values required to represent a set of second information items, and using a sub-partition to transmit a second information item whilst also transmitting a first information item using a first identifier.

According to another aspect of the invention there is provided a network entity for conveying information using a set of first identifiers, the set of first identifiers having a first number, M, of possible values for representing a first number, M, of first information items. The network entity comprises a processing unit adapted to partition the set of first identifiers into a second number, N, of sub-partitions, wherein the second number, N, of sub-partitions represents the number of possible values required to represent a set of second information items. A transmitting unit is adapted to transmit a second information item using a sub-partition, whilst also transmitting a first information item using a first identifier.

According to another aspect of the present invention, there is provided a network entity for receiving information using a set of first identifiers, the set of first identifiers having a first number, M, of possible values for representing a first number, M, of first information items. The network entity comprises a receiving unit adapted to receive a first identifier from a set of first identifiers. A processing unit is adapted to process the first identifier to determine a first information item from the value of the first identifier, the processor being further adapted to determine a second information item based on a sub-partition from which the first identifier relates.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments of the invention described below allow additional information to be conveyed using a first set of identifiers, for example a set of existing identifiers already used in a particular application or infrastructure, such that the services or capabilities of new devices can be enhanced or improved, while still supporting legacy devices and/or existing infrastructure that utilize the existing identifiers.

The embodiments of the invention are concerned with sub-partitioning a set of first identifiers, such as the existing identifiers, to carry additional information. The set of first identifiers can be used to convey what are termed herein a set of first information items, and the additional information used to convey what are termed herein a set of second information items, as will be explained later in the application.

It is noted that existing identifiers might be realized by various data types, for example such as a character string (perhaps including some encoding format), or an integer value. While an existing identifier can take any form, for ease of reference it is noted that the embodiments described below will focus on an identifier having an integer value. However, it is noted that the embodiments of the invention are intended to cover any form of identifier format.

The embodiments of the invention are also based on the premise that an existing identifier has a set number of allowed values. Otherwise, an unlimited number of identifier values would allow practically unlimited length, in which case there would not be any problem in conveying additional information. Thus, the embodiments of the invention assume that the existing identifiers, the set of first identifiers, have a predetermined number of allowed values.

Figure 1:
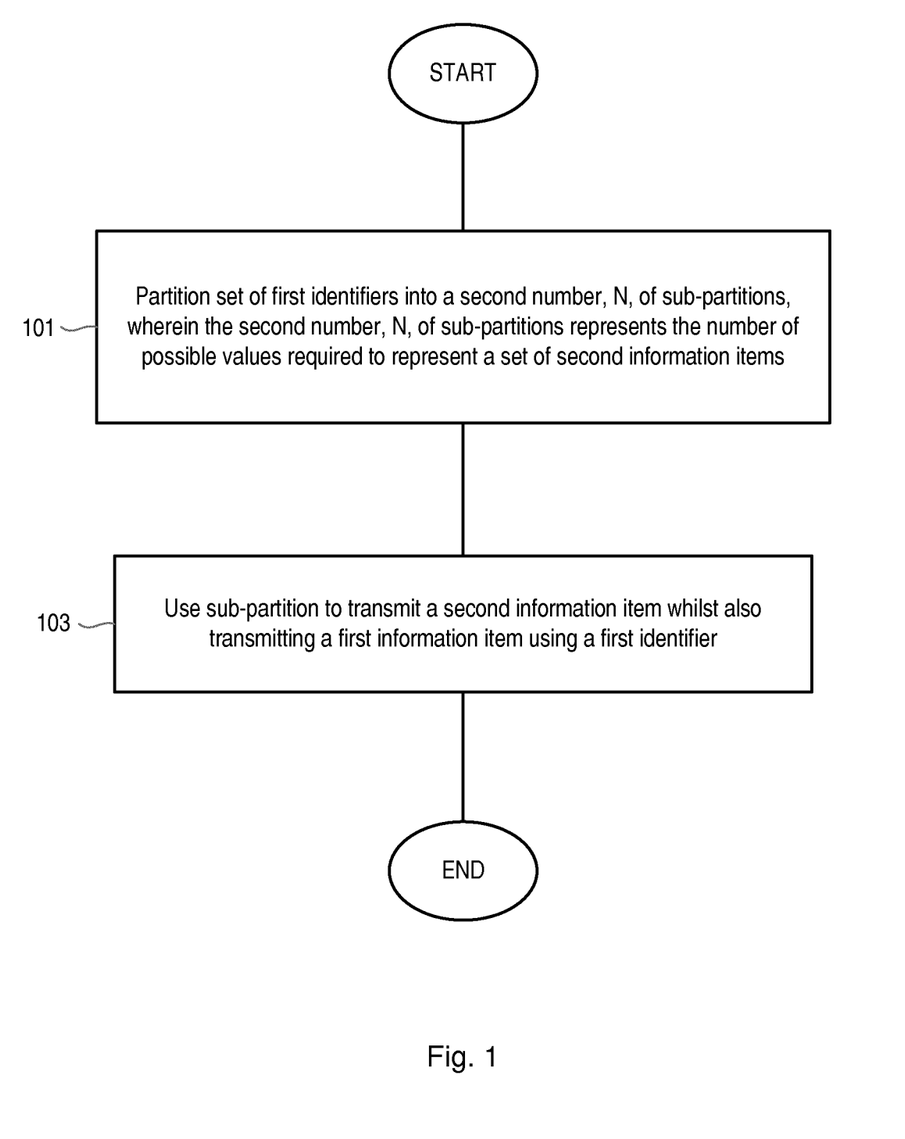
FIG. 1 shows a method according to an embodiment of the invention.

FIG. 1 shows a method according to an embodiment of the invention, for conveying information using a set of first identifiers, the set of first identifiers having a first number M of possible values for representing a first number M of first information items. The set of first identifiers may be existing identifiers used in a particular application, such as event identifiers (event-ids) in a DVB application for identifying programs and the like, or SMS message identifiers for identifying messages in a SMS application. It is noted that the set of first identifiers may comprise any other form of identifiers, without departing from the scope of the invention as defined in the appended claims.

The method comprises the step of partitioning the set of first identifiers into a second number N of sub-partitions, wherein the second number N of sub-partitions represents the number of possible values required to represent a set of second information items, step 101. A sub-partition is used to transmit a second information item whilst also transmitting a first information item using a first identifier, step 103.

This has the benefit that, when needing to convey additional information from a set of second information items, a sending device can choose the value of a first identifier from a sub-partition that matches the second information item, so that the first information item and second information item can be transmitted concurrently using an existing identifier.

A receiving device can then extract the additional information (the second information item) from the existing identifier via a defined sub-partitioning system, while the first identifier is still used to provide a first information item for all other protocol usages. This has the advantage of enabling additional information to be conveyed or transmitted in legacy systems.

Since the existing set of first identifiers have a first number M of values for representing a first number M of first information items, it will be appreciated that there is some form of scope to the uniqueness of an existing identifier, or a first identifier, according to embodiments of the invention. For example, a first identifier can be unique from the sending device in an installed solution, or have some other form of uniqueness.

An example is an event identifier (event_id) used in the digital video broadcast (DVB) protocol, whereby the event_id uniquely identifies a program on a TV channel sent via DVB. The TV channel can be identified, for example, by a DVB triplet (that is, the original network ID, the transport stream ID and the service ID), so the scope of uniqueness for the DVB event identifier is within the DVB triplet.

Existing identifiers might have a repetition period or be unique forever. The case of unique forever might not be same as unlimited length, since the existing identifier length might be limited but still be large enough to be unique forever within the defined scope.

For example, in an SMS application, a protocol might assume that a user device will never send more than 16777216 SMS messages during its lifetime, which means that a 24 bit integer is sufficient for use as an identifier for sending SMS messages, where individual identifiers are required for each SMS message.

Figure 2:
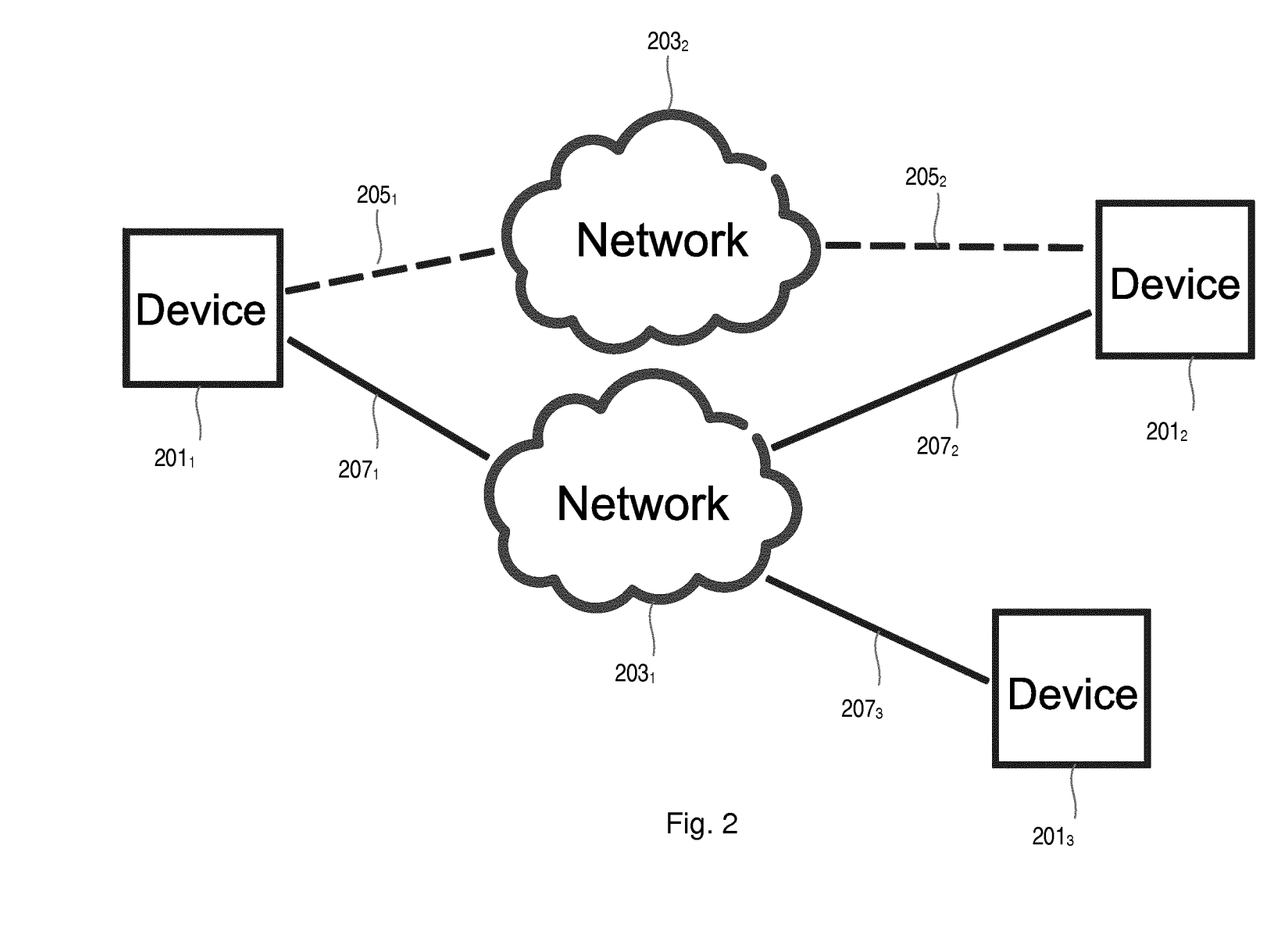
FIG. 2 shows an example of an application of an embodiment of the invention in a network.

FIG. 2 shows an example of how embodiments of the invention might be used in a network. The network of FIG. 2 comprises a plurality of devices, for example devices $201_1$ to $201_3$ (represented by communications shown in solid lines over links $207_1$, $207_2$ and $207_3$). The devices $201_1$ to $201_3$ use an existing legacy protocol via a network $203_1$. Devices $201_1$ and $201_2$ are new devices, while Device $201_3$ is a legacy device that cannot be modified. When devices $201_1$ and $201_2$ communicate, the embodiments of the invention enable them to also pass additional information (i.e. second information items) via the use of existing identifiers, the first set of identifiers, without violating the protocol or disturbing device $201_3$. Additionally, devices $201_1$ and $201_2$ can establish communication, for example, via network $203_2$ (represented by communications shown in dotted lines over links $205_1$ and $205_2$), once they have communicated the additional information (the second information items) via the existing identifiers. It is noted that network $203_1$ might also include relay devices, which understand and relay the protocol.

The protocols applicable to embodiments of the invention are protocols that require that the sending devices ensure that the existing identifier is unique within its scope. Often identifiers are implemented as counters in the sending device, but it is noted that this is more a practical implementation choice than any requirement from a protocol perspective.

Figure 3:
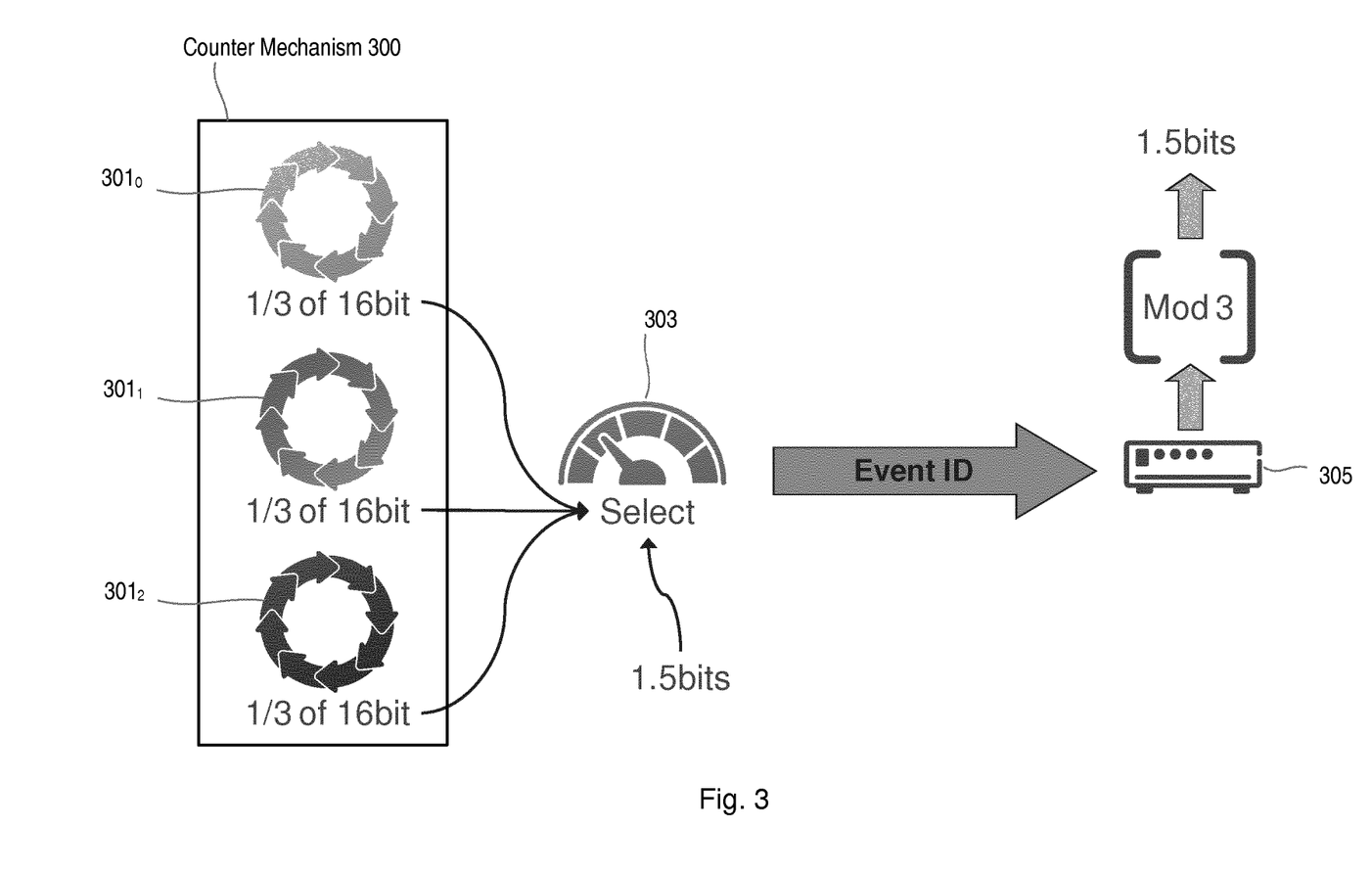
FIG. 3 shows an example of an embodiment for realizing an embodiment of the invention.

Referring to FIG. 3, according to one embodiment the sub-partitioning is realized using a counter mechanism 300. As an example, the counter mechanism of FIG. 3 will be described below using a set of first identifiers, or existing identifiers, in the form of event identifiers (event_id) from a DVB protocol. An event_id can also be used by embodiments of the invention for transmitting or conveying additional information (the second information items).

It is noted that the counter mechanism can be used for conveying any form of second information items, and using any form of existing identifiers. In this particular example the first identifier is a 16 bit integer (which may have a repetition period), and the additional information, i.e. the second information items, is a 1.5 bit value (for example 0, 1 and 2 representing second information items X, Y and Z, respectively). In one example application, as described in co-pending application PCT/EP2013/052250 by the present Applicant, the second information items X, Y, Z represent "block class" information, which is used in the example of the co-pending application to enable time unique TV program identifiers to be provided.

The counter mechanism 300 of FIG. 3 enables a second information item to be conveyed along with a first identifier value itself, for example a first identifier in the form of an event_id, and without stealing any bits from the number of bits normally available for providing first identifiers (i.e. without stealing any of the 16 bits shown in the example for representing an event_id).

This is accomplished by partitioning the counter mechanism 300 of FIG. 3 into separate sub-counters, for example $301_0$ to $301_2$. In other words, the counter mechanism is partitioned into a number of sub-counters which correspond to the number N of different second information items to be conveyed along with the first information item. In the example of FIG. 3, three different second information items are to be conveyed (X, Y and Z), which corresponds to the use of the three sub-counters shown in FIG. 3. It is noted that any number of sub-counters can be used, depending on the number of second information items to be conveyed.

The set of first identifiers (for conveying first information items) are therefore partitioned into different sub-partitions, each sub-partition representing a respective second information item (with each sub-partition comprising a sub-set of first identifiers). As such, each sub-counter $301_0$ to $301_2$ is responsible for generating first identifiers corresponding to a particular second information item. For example, the counter $301_0$ may be responsible for generating one third of the first identifiers (a third of the event_ids) relating to a second information item "X" (sub-set 0), the counter $301_1$ responsible for generating another third of the first identifiers relating to a second information item "Y" (sub-set 1), and the counter $301_2$ responsible for generating another third of the first identifiers relating to a second information item "Z" (sub-set 2). A selecting unit 303 is provided for assigning first identifiers (event_ids) from each of the counters $301_0$ to $301_2$ according to which respective second information item (X, Y or Z, represented by 0, 1 or 2) is to be conveyed alongside that particular first identifier.

According to one embodiment the sub-set 0 can be the $1^{st}$ third of first identifiers (i.e. $1^{st}$ third of event_id numbers), sub-set 1 the $2^{nd}$ third of event_ids, and sub-set 2 the $3^{rd}$ third of event_ids. The initial values of the sub-counters are 0, 1 and 2 respective, and they each step plus 3 until they have passed 65535, at which point they restart on their individual initial value. Thus, when a new first identifier value is needed, the additional information (X, Y or Z, represented by 0, 1 or 2) is used to choose if the next first identifier value should be picked from counter $301_0$, $301_1$ or $301_2$, respectively.

In a receiving device or network entity (for example a STB in this scenario), the DVB software uses the DVB event_id as any other DVB event_id. However, in the case of a new device or network entity the software can also extract the additional information via a MOD 3 operation on the event_id value.

In such an embodiment the step of partitioning the existing set of first identifiers comprises the steps of partitioning such that a first sub-partition includes a first sub-set of M/N values of first identifiers, a second sub-partition includes a second sub-set of M/N values of first identifiers, and an Nth sub-partition includes an Nth sub-set of M/N first identifiers (where M relates to the number of possible values of the first identifier, and N the number of possible values required to represent the second information items, the latter also corresponding to the number of sub-partitions or sub-sets).

Figure 4:
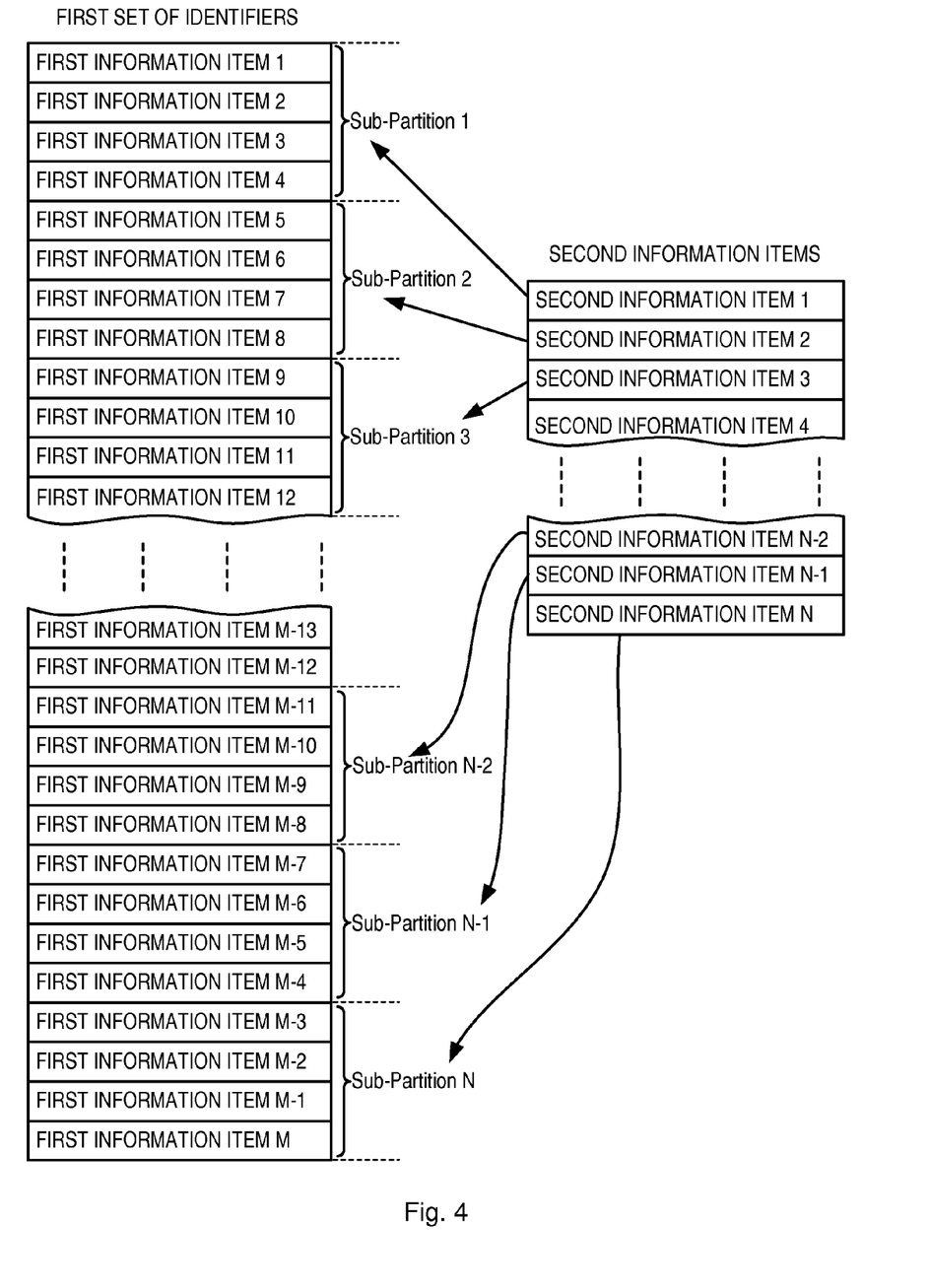
FIG. 4 shows how a set of first identifiers may be partitioned according to one example embodiment of the invention.

FIG. 4 shows an example of such a sub-partitioning format, whereby a set of first identifiers comprising M possible first information item values are sub-partitioned such that the N number of second information items are allocated as follows. A first sub-set of first identifiers (sub-partition 1 comprising first information items 1 to 4 in the example) correspond to a first value of a second information item ("Second Information Item 1"), a second sub-set of first identifiers (sub-partition 2 comprising first information items 5 to 8 in the example) correspond to a second value of a second information item ("Second Information Item 2"), and so on.

According to another embodiment, the set of first identifiers can be partitioned in an interleaved manner, such that the modulo 3 of the first identifier value, for example, can be used to determine the second information item assigned thereto. In such an embodiment the step of partitioning the existing set of first identifiers comprises the step of partitioning such that the N different sub-partitions are interleaved among the M values of first identifiers.

In an interleaved embodiment, the step of partitioning by interleaving may comprise the step of interleaving the sub-partitions among successive values of first identifiers. Alternatively, the step of partitioning by interleaving may comprise the step of interleaving the sub-partitions using a defined function among values of the first identifiers.

Figure 5:
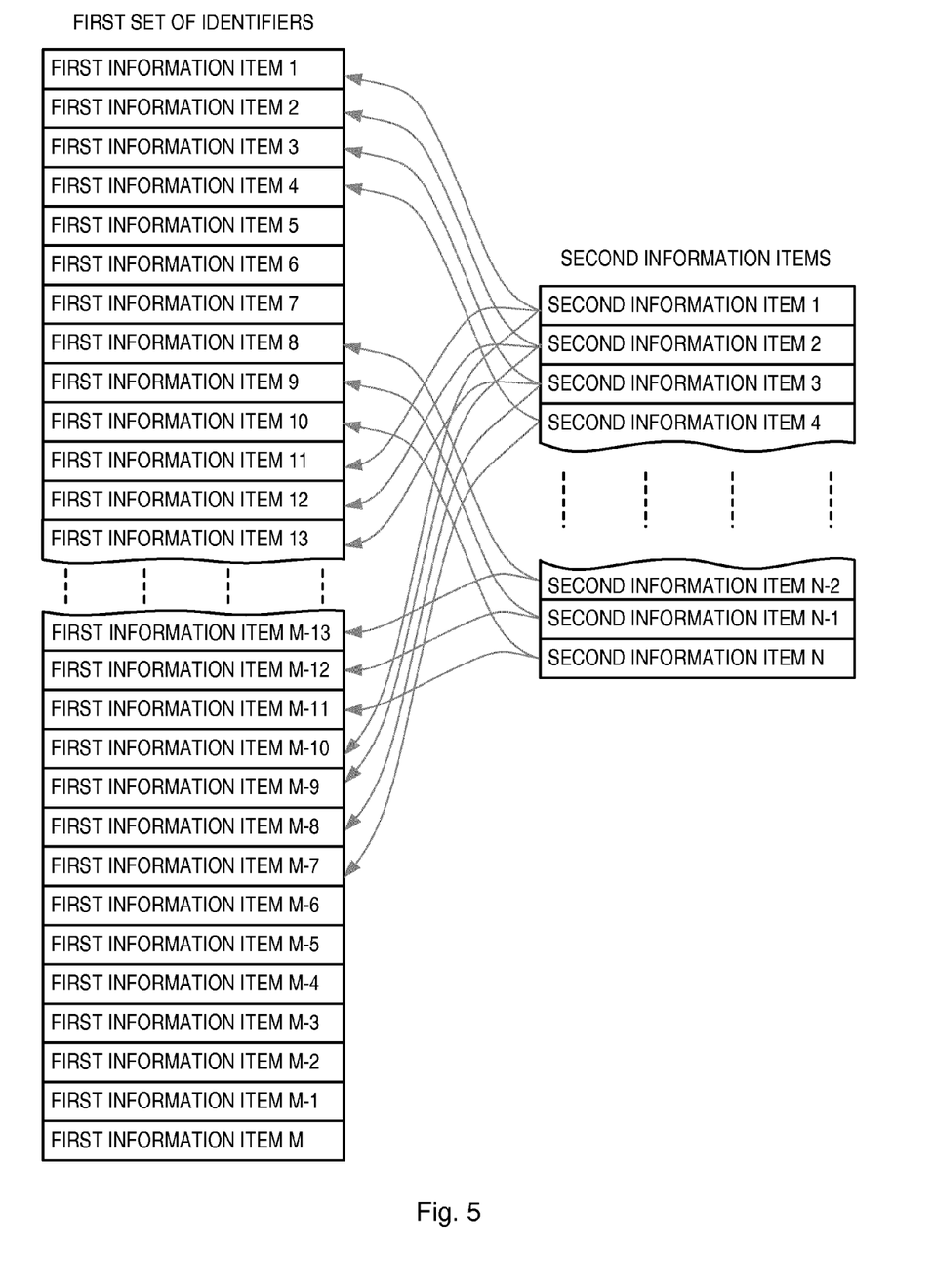
FIG. 5 shows how a set of first identifiers may be partitioned according to another example embodiment of the invention.

FIG. 5 shows an example of an interleaved sub-partitioning format, whereby a first set of identifiers comprising M possible first information item values are sub-partitioned in an interleaved manner, such that the N number of second information items are partitioned in an interleaved manner within the set of first identifiers.

Whatever sub-partitioning system or algorithm is used, it will be known to both a network entity functioning as a sending device (for example a server node or network device) and a network entity functioning as a receiving device (for example a client entity, user device, STB), either by defining this in advance, or determining this during operation in some way, for example using information conveyed to a network entity and/or client entity during operation.

Another example of an application of an embodiment of the invention will now be provided in relation to SMS messaging, in which a SMS sending protocol from an end-user device to a network device is using a SMS message identifier for each SMS message being sent. The SMS message identifiers correspond to a set of first identifiers for conveying or representing a first number M of first information items.

The message identifiers are typically used during the sending process, and also for confirmation messages such as Message Delivered and Message Read. In addition, the SMS message identifier for the first message in a message conversation thread (several replies between two end-users) is used to identify the message thread. The scope of the message identifier is the sending device, so any reference to the SMS message identifier outside the sending device will be complemented with the sending device identifier. Since replies to SMS messages may be sent at any time, the message identifier has no repetition period, and it is to be unique forever. The SMS message identifier has a length, for example, of a 24 bit integer value, which makes it possible to send 16777216 messages from a device. This is considered a sufficient number of unique message identifiers, even for a typical usage by a teenager (who might send several thousand text messages per month).

Figure 6:
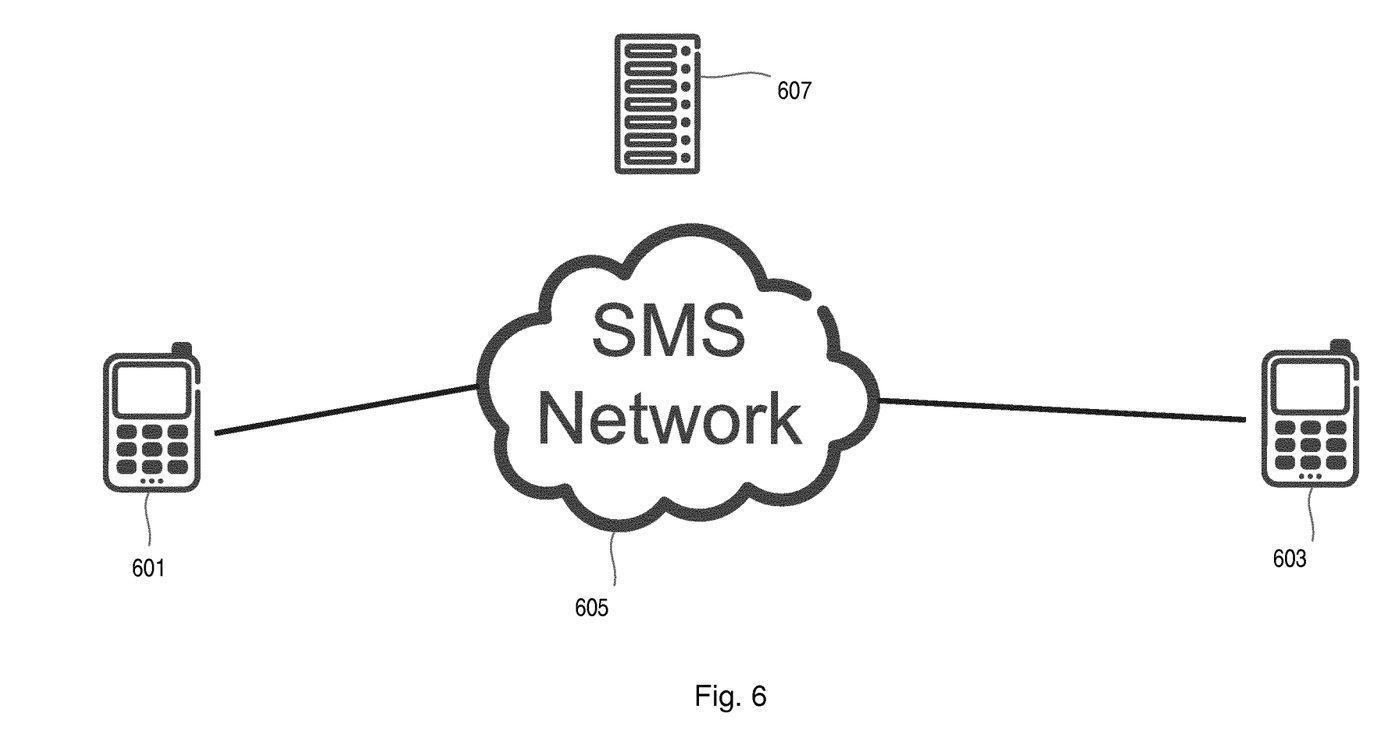
FIG. 6 shows an example of an application of an embodiment of the invention in a network.

A desirable feature in the evolved phone world is to automatically translate SMS messages between end-users. As show in FIG. 6, end-user devices 601 and 603 communicate via an SMS network 605. A translator mechanism 607 is coupled to the SMS network 605. In some applications a translator mechanism 607 attempts to automatically detect the original language for the SMS message, and then translate the SMS message accordingly. However, since it is difficult to automatically detect the language of a SMS message, especially for short messages, a far more reliable method of translating would be if the sending device could indicate the language of the text.

To specify the original language of the text message, 8 bits might be needed to represent all of the possible languages (which would allow information relating to 256 different languages to be conveyed). One method of conveying such second information items (i.e. the language of a particular SMS message) would be to steal 8 bits from the message identifier to indicate the language being used. However, this would leave only 16 bits remaining as real uniqueness for the SMS message identifier itself. That would reduce the number of possible unique messages being sent from a device to just 65536, which is not enough to cover usage by a typical teenager, which as indicated above may be several thousand messages per month.

However, according to embodiments of the invention the language type information, i.e. second information items, can be conveyed implicitly alongside the unique SMS message identifier by sub-partitioning the possible values for the SMS message identifiers. For example, in the scenario described above 256 sub-partitions may be used in this example to represent up to 256 possible source languages of the SMS messages. Thus, when a sending device creates a SMS message identifier, a known sub-partitioning algorithm can be used to select a SMS message identifier from a particular sub-partition that corresponds to a particular source language of that text message.

As such each sub-partition of the SMS message identifiers maps to one of 256 values (256 second information items), whereby an explicit sub-partition choice is actually 8 bits of information.

Since the sub-partition algorithm can be defined and known by all new devices, a receiving device can extract the language from the SMS message identifier itself.

In the event that a sub-counter algorithm is used, for example as described above in relation to FIG. 3, but having 256 sub-counters, a receiving device is able to use a simple MOD operation to extract the language value from the SMS message identifier value.

According to one embodiment, the step of partitioning a set of first identifiers comprises the step of partitioning the set of first identifiers such that each sub-partition is substantially equal in size.

In certain applications, however, for example the text message language application described above, a problem can occur with the sub-partitioning of existing identifiers, whereby different partitions can be consumed irregularly. This would occur if the values transferred as the second information item do not have an ensured uniformed distribution over time. As in the case above, it will be appreciated that a particular end user would send most SMS messages in the same (or very few) languages. As a consequence, the values from one sub-partition will be consumed much faster, jeopardizing the uniqueness perspective of the identifier in the protocol.

Thus, according to another aspect of the invention, mechanisms are provided to avoid irregular consumption of one or more sub-partitions compared to other sub-partitions.

According to one embodiment a partitioning mechanism can support known (but un-even) spreading of the second information items by either having sub-partitions of different sizes, or matching values of second information items to multiple sub-partitions.

For example, according to one embodiment the step of partitioning an existing set of first identifiers comprises the step of partitioning the set of first identifiers such that at least one sub-partition is larger than another sub-partition of the N sub-partitions. Alternatively, the step of partitioning an existing set of first identifiers comprises the step of partitioning the set of first identifiers such that the N sub-partitions are sized according to the expected frequency of respective second information items.

For example, with 4 sub-partitions, a first sub-partition could have 50% of the first identifier values (and represent a 1st second information item), a second sub-partition could have 25% of the first identifier values (and represent a $2^{nd}$ second information item), a third sub-partition could have 15% of the first identifier values (and represent a $3^{rd}$ second information item), while a fourth sub-partition could have 10% of the first identifier values (and represent a $4^{th}$ second information item). Other partition formats are also intended to be embraced by embodiments of the invention, including whereby only one sub-partition is different in size, or whereby two or more sub-partitions have the same size, but which are different to other sub-partitions. Effectively, any combination of sub-partition sizes may be used.

Alternatively, the step of partitioning an existing set of first identifiers comprises the step of partitioning the set of first identifiers such that multiple sub-partitions are allocated to a particular second information item. In such an embodiment the scheme used by the partitioning mechanism (known by all devices participating in the scheme) could specify that multiple sub-partitions (with equal and/or unequal size, for example) match one value of the second information item to be sent. Then, a sending device can randomly select between these (possible) multiple sub-partitions matching the wanted value, while a receiving device can convert according to the defined mapping.

According to other embodiments of the invention, the use of sub-partitions can be spread more evenly over time by using other existing information in the protocol (such as a message sending time, or content from within the message being transmitted) to alter the additional information before it is used to select the sub-partition.

According to such embodiments the partitioning mechanism is adapted to modify the additional information based upon other included information (to cause a more even spreading) before selecting a particular sub-partition.

In such an embodiment the adaptation can include three effective algorithms: a generation algorithm, a shuffling algorithm and a de-shuffling algorithm. The generation algorithm generates a shuffle value from other existing information in the protocol, visible for both a sending device and a receiver device. The shuffling algorithm uses a shuffle value to modify the second information item, while the de-shuffling algorithm uses the same shuffle value to restore the second information item. In this manner the shuffling algorithm and the de-shuffling algorithm have matching algorithms, but it is noted that they might also be the same algorithm if a second execution of the same algorithm would act to reverse the result of the first execution (for example, as is the case with an XOR function).

The combination of the generation algorithm and shuffle algorithm act together to manipulate the second information item to be uniformly distributed over time, thereby ensuring that sub-partitions are consumed more evenly over time. Typically this done by, but not limited to, a combination of the generation algorithm and its input data that would cause the generation algorithm to generate a shuffle value with uniform distribution over time, such that the shuffling algorithm is able to transfer this uniformity into the second information item.

As an example, in an application whereby 8 bits of information are used to provide the language of the text message, as described above, at least a portion of the message, for example the sending time of a message, that is included in the message, (for example expressed as Unix time, as known in the art) can be used as input to a generation algorithm (that extracts the lower 8 bits from the Unix time) to extract a shuffle value, being 8 "random" bits, which are then used to modify the second information item (the modifying being performed by the shuffle algorithm).

In such an embodiment the step of partitioning a set of first identifiers comprises the steps of: receiving a second information item to be transmitted; obtaining a shuffle value; modifying the second information item using the shuffle value; and allocating a modified second information item to a respective sub-partition of the first identifiers.

According to one embodiment, the shuffle value is used to modify the second information item using a shuffle algorithm that performs a XOR calculation (in the sending device) to ensure that the consumption of sub-partitions is spread equally or more evenly. A receiving device is then able to use a de-shuffling algorithm that also performs a matching XOR calculation to extract the real value.

It is noted that extracting a shuffle value, such as the lower 8 bits (256 seconds cycle) from the sending time of the message might be acceptable in the embodiment described above, but in other scenarios more input is needed for the generation algorithm since the sending time itself might not be sufficient to shuffle the second information item so that irregular consumption of the sub-partitions is avoided.

Thus, according to another embodiment more data available from within the protocol is used to modify the second information item in a more distributed manner to provide a unified distribution value over time. For example, as an alternative to the sending time, a receiving device phone number and/or at least a portion (or whole) of the message text (or information) can be used as input for the algorithms (generation algorithm and shuffle algorithm) that modify the second information item.

It is noted that a hash function (as understood by a person skilled in the art) "compresses" a lot of information to a (often fixed size) value, and provides good uniformity of the output value as long as the input changes in any way at all. An example of hash functions with good uniformity is cryptographic hash functions, but any other form of hash function may also be used.

According to one embodiment at least a portion of information from a message (for example a sending time, receiving device phone number and/or at least a portion of the message text) is provided as input for a generation algorithm based on a hash function, whereby the hash function would use the defined information in the message to generate a shuffle output which is an as evenly as possible spread of the possible shuffle values, with the shuffle value being used for the shuffle operation, such as an XOR operation.

It can therefore been seen from the embodiments described above that the shuffle value used for modifying a second information item can comprise any one of: an information item from a message being used to transmit the first identifier; a time reference included in a message being used to transmit the first identifier; or at least a portion of a message being used to transmit the first identifier; or at least a portion of text from a message being used to transmit the first identifier.

Thus, it can be seen from the embodiments described above that the method may further comprise the step of using a hash function to ensure that a second information item is distributed more evenly among sub-partitions.

It is noted that any of the techniques mentioned above may be used alone, or in combination, depending on a particular application.

Figure 7:
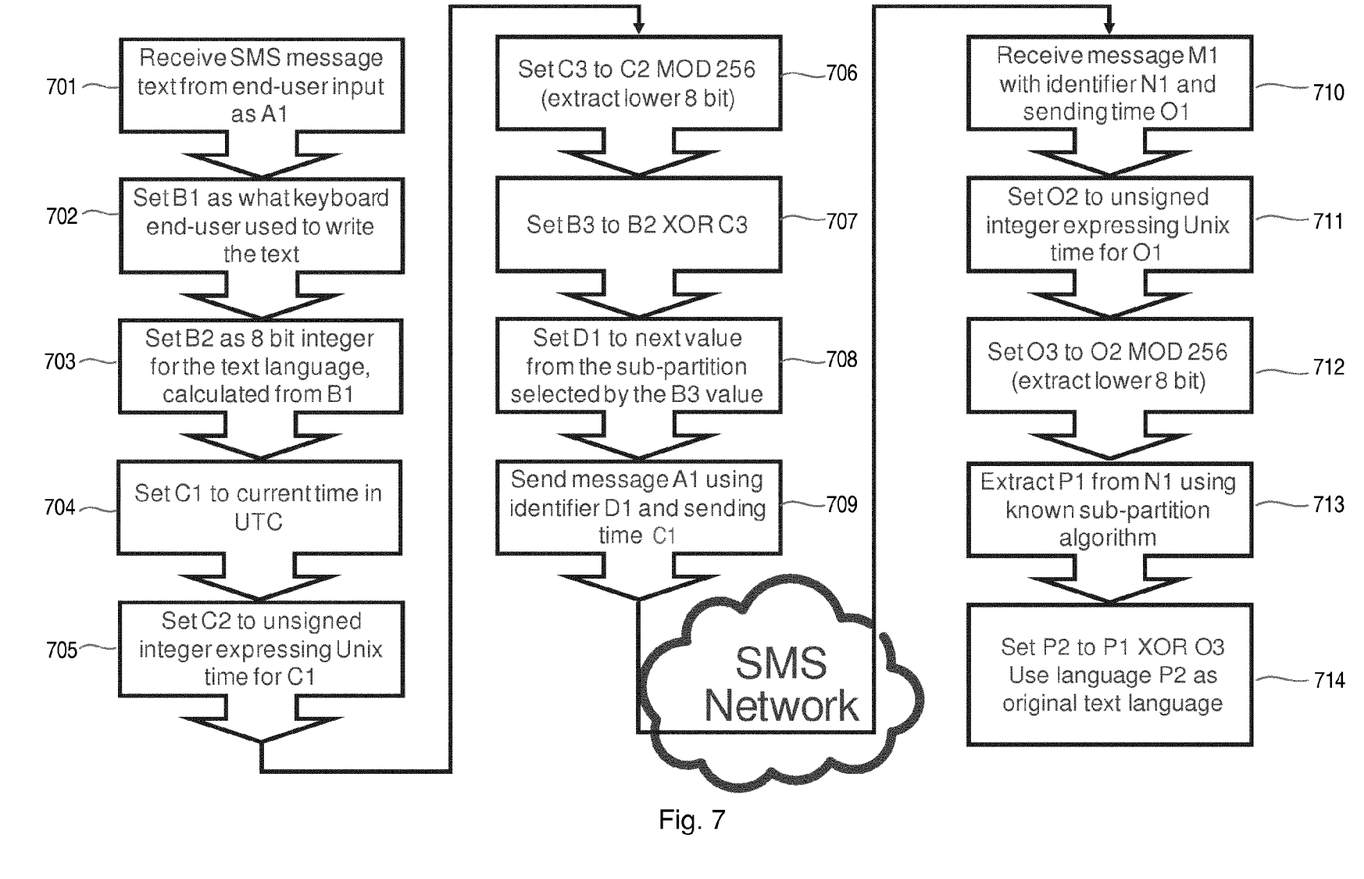
FIG. 7 shows further details of a method according to an embodiment of the invention.

FIG. 7 shows further details of the steps that may be performed in an example application relating to SMS messaging. In step 701 a SMS message is received from an end-user input, the SMS message referred to as parameter A1. For explanation purposes assume that the message A1 is "Hello World", for example.

In step 702 a parameter B1 indicates the keyboard used by the end-user to write the text message, representing the language of the text message. Again, for explanation purposes assume that B1 equals "English keyboard".

In step 703 a parameter B2 is set as an 8 bit integer for the text language determined from B1. For example, assume B2=45 (00101101): corresponding to the message text being in English.

In step 704 a parameter C1 is set to the current time, for example using universal time, UTC. For example, assume C1="2013-06-20 12:00:00".

In step 705 a parameter C2 is set to an unsigned integer expressing Unix time for C1. For example, assume C2=137172960.

In step 706 a parameter C3 is set to C2 Mod 256, making C3 the shuffle value by using the simple generation algorithm of extracting the lower 8 bits from the sending time C1 (that will be included in the message). For example:

$$C3=C2 \text{ MOD } 256=132(10000100)$$

In step 707 a parameter B3 is set to (B2 XOR C3), thereby shuffling the B2 value (i.e. 00101101 as described above in step 703) with the shuffle value C3 (10000100) using the shuffle algorithm (which in this example is an XOR operation). Thus:

$$B3=B2 \text{ XOR } C3=169(10101001)$$

In step 708 a parameter D1 is set to the next value from a sub-partition selected by the B3 value. For example:

$$D1=\text{getIdFromPartition}(169)$$

In step 709 the message A1 is sent using identifier D1 and the sending time C1, such that the message comprises (A1, D1, C1).

In step 710 a message M1 (corresponding to message A1) is received by another device or network entity, the message M1 comprising an identifier N1 (corresponding to the identifier D1) and sending time O1 (corresponding to the sending time C1, "2013-06-20 12:00:00").

In step 711 a parameter O2 (corresponding to C2) is set to an unsigned integer expressing Unix time for O1 (O2 set to 137172960 in this example).

In step 712 a parameter O3 is set to (O2 MOD 256), making O3 the extracted shuffle value by using the same generation algorithm of extracting the lower 8 bits from the sending time for the message (that is making O3 equal to C3).

$$O3=O2 \text{ MOD } 256=132(10000100)$$

In step 713 a parameter P1 is extracted from N1 (corresponding to D1) using the known sub-partitioning algorithm or rules, that is, extracting B3 as P1 as follows:

$$P1=\text{getPartitionFromId}(N1)=169=B3(10101001)$$

Finally, in step 714 a parameter P2 is set to (P1 XOR O3), thereby de-shuffling the value P1 using a de-shuffling algorithm (XOR in this example) with the shuffle value O3, such that the parameter P2 can be used as the language of the original text (corresponding to B2). That is:

$$P2=P1 \text{ XOR } O3=169 \text{ XOR } 132=00101101=45=B2$$

The message, M1 (corresponding to A1), can now be translated from English, P2 (corresponding to B2), to the receiving user's preferred language before being forwarded/displayed to the receiving user. For example, the language P2 identified above may then be used by a translator mechanism, for example, for translating the text message A1.

Figure 8:
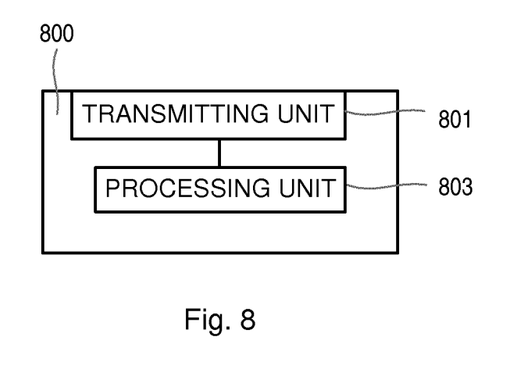
FIG. 8 shows a network entity according to an embodiment of the invention.

FIG. 8 shows a network entity 800 according to an embodiment of the invention, for conveying information using a set of first identifiers. The set of first identifiers have a first number, M, of possible values for representing a first number, M, of first information items. The network entity 800 comprises a processing unit 803 adapted to partition the set of first identifiers into a second number, N, of sub-partitions, wherein the second number, N, of sub-partitions represents the number of possible values required to represent a set of second information items. A transmitting unit 801 is adapted to transmit a second information item using a sub-partition, whilst also transmitting a first information item using a first identifier.

As such, the second information item is effectively transmitted in an implicit manner, according to which sub-partition a particular first identifier is selected from.

Figure 9:
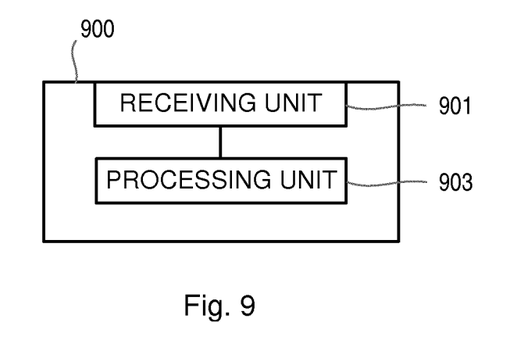
FIG. 9 shows a network entity according to another embodiment of the invention.

FIG. 9 shows a network entity 900 according to an embodiment of the invention, for receiving information using a set of first identifiers. The set of first identifiers has a first number, M, of possible values for representing a first number, M, of first information items. The network entity (900) comprises a receiving unit 901 adapted to receive a first identifier from a set of first identifiers. A processing unit 903 is adapted to process the first identifier to determine a first information item from the value of the first identifier. The processing unit 903 is further adapted to determine a second information item based on a sub-partition from which the first identifier relates.

The processing unit effectively receives a first identifier, such as an existing legacy identifier, and extracts the first information item relating to a legacy identifier. However, the processing unit is also able to determine further information, a second information item, based on which sub-partition the first identifier resides in. In this way the sub-partition information allows the second information item to be derived in effectively an implicit manner. The second information item is effectively conveyed in an implicit manner concurrently with the first information item.

It is noted that the network entities of FIGS. 8 and 9 may be any form of network entity including, but not limited to, a network node (such as a base station or eNB or DVB server), a wireless terminal (such as a user equipment device, or a machine-to-machine device or a set-top-box), an intermediate network element, or a functional module forming part of another device or entity in a telecommunications network or system.

The partitioning mechanism used by different entities for a particular application may be passed to the network entities in a variety of ways. For example, the partitioning scheme or rules may be pre-configured during a set-up phase, or configured during operation whereby entities are informed of a partitioning mechanism being applied to a set of first identifiers, and how one or more second information items map to each of the sub-partitions of the set of first identifiers.

The embodiments of the invention described above have the advantage of enabling a first set of identifiers to be used in their normal context, for example in legacy based applications, while also allowing the set of first identifiers to be partitioned into a plurality of sub-partitions, such that the plurality of sub-partitions can be used to transmit one or more second information items, based on a known mapping between second information items and sub-partitions.

Various techniques are described for allowing sub-partitions to be consumed more evenly.

According to another aspect of the invention, further details will now be provided in connection with how an embodiment of the invention can enable a receiving device or entity to determine whether or not any second information items are being conveyed along with the first information items (i.e. along with the first identifiers).

A device may receive messages both from a legacy protocol P and from an extension of protocol P, herein termed P++, P++ being the extension of the protocol which conveys the second information items along with the first identifier defined by protocol P (the first identifier being a message identifier, for example, in the application described above).

A mechanism can be provided for enabling a receiving device to determine whether the first identifier of a received message conveys a second information item or not, i.e. whether the message is received via protocol P or protocol P++.

According to one embodiment a receiving device is adapted to receive a predetermined number of messages from a given network/source, and from the predetermined number extract the second information item from each of the first message identifiers. The device can then conclude if the statistical distribution is aligned with what is expected from protocol P++.

If the device is aware of the expected distribution of second information items it can perform a statistical calculation on the received second information items to statistically prove if the messages are transmitted over protocol P or protocol P++.

For example, in an application such as that described in co-pending application PCT/EP2013/052250 by the present Applicant, where the first identifiers are event identifiers (event_id), and the second information items a "block class" assigned to each event identifier (for example block classes "0", "1" or "2" for enabling unique event identifiers to be provided), for a stream of EPG data covering less than a month of programs, an event_id MOD 3 class (secondary information item) is expected to (almost always) contain only two of the three possible valid values (i.e. from block classes 0, 1, 2).

If the second information item carries information that can be extracted/checked towards any other information in the message, it can also prove if the messages are transmitted over protocol P or protocol P++. Example: event_id MOD 3 class (secondary information item) is expected to (almost always) be identical to MonthSinceJan1970 (start_time) MOD 3 class.

In another application relating to the use of SMS messages as described above, in a first example a receiver might expect one sender to send its messages in more than X different languages. That is, if messages from the same sender indicates very many different languages it will assume Protocol P. In a second example of a SMS application the message text may be analysed and if a certain percentage of words are available in the dictionary of the indicated language it will assume that Protocol P++ is being used. It is noted that the first example would in this case require a comparatively large sample of messages while the second example would require a comparatively smaller sample (possibly even applicable for one single message)

In this way, according to another aspect of the invention the method comprises the steps of extracting a series of secondary information items from a series of first identifiers, and evaluating the pattern of secondary information items to determine whether a valid protocol is being used to transmit secondary information items. This has the advantage of enabling a receiving device to determine whether or not secondary information items are being conveyed along with the first identifiers.

Therefore, in a network entity such as that described in FIG. 9, i.e. a network entity acting as a receiving device, the receiving unit 901 may be further adapted to receive a series of first identifiers from the set of first identifiers, and whereby the processing unit 903 is further adapted to extract a series of secondary information items from the series of first identifiers, and evaluate the pattern of secondary information items to determine whether a valid protocol is being used to transmit secondary information items.

The embodiments of the invention described below allow additional information to be conveyed using a first set of identifiers, for example a set of existing identifiers already used in a particular application or infrastructure, such that the services or capabilities of new devices can be enhanced or improved, while still supporting legacy devices and/or existing infrastructure that utilize the existing identifiers.

It is noted that while certain embodiments refer to a specific number of bits or partitions, the embodiments of the invention are not intended to be limited to such specific examples, and are intended to include other variations as defined by the appended claims.

It will be appreciated from the above that the embodiments of the invention assume that the existing identifiers do not have such a large length such that a number of bits can be stolen from them for conveying additional information. In the words, the embodiments of the invention assume that existing bits are required for conveying the existing information that is to be conveyed by the existing identifiers.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of conveying information using a set of first identifiers, the set of first identifiers having a first number, M, of possible values for representing a first number, M, of first information items, the method comprising the steps of:
  partitioning the set of first identifiers into a second number, N, of sub-partitions, wherein the second number, N, of sub-partitions represents the number of possible values required to represent a set of second information items, wherein each partition of the second number, N, of sub-partitions includes a subset of the first identifiers; and
  using a sub-partition to transmit a second information item whilst also transmitting a first information item using a first identifier,
  wherein step of partitioning the set of first identifiers further comprises the steps of:
    partitioning such that a first sub-partition includes a first sub-set of M/N values of first identifiers, a second sub-partition includes a second sub-set of M/N values of first identifiers, and an Nth sub-partition includes an Nth sub-set of M/N values of first identifiers; or
    partitioning such that the N sub-partitions are interleaved among the M values of first identifiers.

2. A method as claimed in claim 1, wherein the step of partitioning a set of first identifiers comprises the step of:
  partitioning the set of first identifiers such that each sub-partition is substantially equal in size.

3. A method as claimed in claim 1, wherein the step of partitioning a set of first identifiers comprises the steps of:
  partitioning the set of first identifiers such that at least one sub-partition is larger than another sub-partition of the N sub-partitions; or
  partitioning the set of first identifiers such that the N sub-partitions are sized according to the expected frequency of respective second information items to be transmitted; or
  partitioning the set of first identifiers such that multiple sub-partitions are allocated to a particular second information item.

4. A method as claimed in claim 1, wherein the step of partitioning by interleaving comprises the step of:
  interleaving the N sub-partitions among successive values of first identifiers; or
  interleaving the N sub-partitions using a defined function among values of the first identifiers.

5. A method as claimed in claim 1, further comprising the steps of:
  receiving a second information item to be transmitted;
  obtaining a shuffle value;
  modifying the second information item using the shuffle value; and
  allocating a modified second information item to a respective sub-partition of the first identifiers.

6. A method as claimed in claim 5, wherein the shuffle value comprises:
  an information item from a message being used to transmit the first identifier; or
  a time reference included in a message being used to transmit the first identifier; or
  at least a portion of a message being used to transmit the first identifier; or
  at least a portion of text from a message being used to transmit the first identifier.

7. A method as claimed in claim 5, further comprising the step of using a hash function to generate the shuffle value.

8. A method as claimed in claim 5, wherein the step of modifying the second information item comprises the step of performing an XOR operation using the shuffle value.

9. A method as claimed in claim 1:
  the first information items relate to short messaging service, SMS, message identifier values, and the second information items relate to the identity of the language used for corresponding SMS messages; or
  the first information items relate to event identifier values of a digital video broadcast signal, and the second information items relate to further information to be conveyed with the event identifier values.

10. A method as claimed in claim 1, wherein the step of partitioning the set of first identifiers M into a second number N of sub-partitions comprises the step of providing a counter mechanism for generating the first identifiers, wherein the counter mechanism comprises N sub-counters, and wherein each sub-counter generates a sub-set of first identifiers corresponding to a second information item.

11. A method as claimed in claim 10, wherein:
each sub-set of first identifiers comprises a sequential range of first identifier values;
Or each sub-set of first identifiers comprises an interleaved set of first identifier values.

12. A network entity for conveying information using a set of first identifiers, the set of first identifiers having a first number, M, of possible values for representing a first number, M, of first information items, the network entity comprising:
a processor operable to partition the set of first identifiers into a second number, N, of sub-partitions, wherein the second number, N, of sub-partitions represents the number of possible values required to represent a set of second information items, wherein each partition of the second number, N, of sub-partitions includes a subset of the first identifiers; and
a transmitter operable to transmit a second information item using a sub-partition, whilst also transmitting a first information item using a first identifier,
wherein the processor is operable to partition the set of first identifiers by:
partitioning such that a first sub-partition includes a first sub-set of M/N values of first identifiers, a second sub-partition includes a second sub-set of M/N values of first identifiers, and an Nth sub-partition includes an Nth sub-set of M/N values of first identifiers; or
partitioning such that the N sub-partitions are interleaved among the M values of first identifiers.

13. A network entity as claimed in claim 12, further comprising the steps of receiving a second information item to be transmitted along with a first information item, and wherein the processor is further operable to select a first information item from a sub-partition of the set of first identifiers relating to the second information item.

14. A network entity for receiving information using a set of first identifiers, the network entity comprising:
a receiver operable to receive a first identifier from a set of first identifiers, the set of first identifiers having a first number, M, of possible values for representing a first number, M, of first information items, the set of first identifiers being partitioned into a second number, N, of sub-partitions, each partition of the second number, N, of sub-partitions includes a subset of the set of first identifiers; and
a processor operable to:
process the first identifier to determine a first information item from the value of the first identifier; and
determine a second information item based on a particular sub-partition from which the first identifier relates,
wherein:
a first sub-partition includes a first sub-set of M/N values of first identifiers, a second sub-partition includes a second sub-set of M/N values of first identifiers, and an Nth sub-partition includes an Nth sub-set of M/N values of first identifiers, or
the N sub-partitions are interleaved among the M values of first identifiers.

15. A network entity as claimed in claim 14 wherein:
the receiver is further operable to receive a series of first identifiers from the set of first identifiers; and wherein
the processor is further operable to extract a series of secondary information items from the series of first identifiers, and evaluate the pattern of secondary information items to determine whether a valid protocol is being used to transmit secondary information items.

\* \* \* \* \*